United States Patent
Noh

(10) Patent No.: US 11,552,568 B2
(45) Date of Patent: Jan. 10, 2023

(54) SWITCHING REGULATOR AND POWER MANAGEMENT UNIT INCLUDING THE SAME

(71) Applicant: Samsung Electronics Co., Ltd., Suwon-si (KR)

(72) Inventor: Gwangyol Noh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 117 days.

(21) Appl. No.: 16/823,481

(22) Filed: Mar. 19, 2020

(65) Prior Publication Data
US 2020/0304028 A1    Sep. 24, 2020

(30) Foreign Application Priority Data

Mar. 21, 2019  (KR) .......................... 10-2019-0032543
Dec. 13, 2019  (KR) .......................... 10-2019-0167142

(51) Int. Cl.
*H02M 3/158*    (2006.01)
*H02M 1/00*    (2006.01)

(52) U.S. Cl.
CPC .......... *H02M 3/1582* (2013.01); *H02M 1/007* (2021.05)

(58) Field of Classification Search
CPC .. H02M 3/158; H02M 3/1582; H02M 3/1588; H02M 1/0067; H02M 1/007; H02M 1/0074

See application file for complete search history.

(56) References Cited

U.S. PATENT DOCUMENTS

| | | | | |
|---|---|---|---|---|
| 4,184,197 A | * | 1/1980 | Cuk | ....................... H02M 3/005 363/16 |
| 4,186,437 A | * | 1/1980 | Cuk | ....................... H02M 3/005 363/16 |
| 6,486,642 B1 | * | 11/2002 | Qian | ..................... H02M 3/158 323/255 |
| 7,977,928 B2 | | 7/2011 | Fahrenbruch et al. | |
| 8,138,744 B2 | * | 3/2012 | Nagano | ................... H01F 37/00 323/350 |

(Continued)

OTHER PUBLICATIONS

Oswaldo Lopez-Santos, et al. "Efficiency analysis of a sliding-mode controlled quadratic boost converter," IET Power Electron, vol. 6, Issue No. 2, pp. 364-373 (2013).

Mojtaba Forouzesh, et al. "Step-Up DC-DC Converters: A Comprehensive Review of Voltage-Boosting Techniques, Topologies, and Applications," IEEE Transactions on Power Electronics, vol. 32, No. 12, pp. 9143-9178 (2017).

(Continued)

*Primary Examiner* — Gustavo A Rosario-Benitez
(74) *Attorney, Agent, or Firm* — Harness, Dickey & Pierce, P.L.C.

(57) ABSTRACT

Provided are a switching regulator and a power management unit including the switching regulator. A switching regulator configured to transform an input voltage and generate an output voltage includes a first regulating circuit configured to regulate the input voltage and to generate a first voltage based on a first switching signal set having a first duty ratio, and a second regulating circuit configured to regulate the first voltage and to generate the output voltage based on a second switching signal set having a second duty ratio. The switching regulator determines a voltage gain based on the first duty ratio and the second duty ratio, the voltage gain corresponding to a ratio of the output voltage to the input voltage.

20 Claims, 15 Drawing Sheets

(56) References Cited

U.S. PATENT DOCUMENTS

| | | | |
|---|---|---|---|
| 8,803,498 B2* | 8/2014 | Hunt | H02M 3/156 323/283 |
| 8,860,387 B2 | 10/2014 | Kobayashi | |
| 9,000,740 B2 | 4/2015 | Touzani et al. | |
| 9,590,519 B2 | 3/2017 | Luh et al. | |
| 9,837,900 B2* | 12/2017 | Sylla | H02M 3/1584 |
| 10,110,103 B1 | 10/2018 | Hao et al. | |
| 10,651,731 B1* | 5/2020 | Rainer | H02M 3/1588 |
| 2007/0216390 A1* | 9/2007 | Wai | H02M 3/158 323/351 |
| 2011/0285369 A1* | 11/2011 | Cuk | H02M 3/158 323/282 |
| 2012/0051097 A1* | 3/2012 | Zhang | H02M 3/158 363/21.07 |
| 2012/0249102 A1* | 10/2012 | Cuk | H02M 3/158 323/282 |
| 2013/0154586 A1* | 6/2013 | Taylor | H02M 1/14 323/247 |
| 2014/0132231 A1 | 5/2014 | Tsai et al. | |
| 2015/0263608 A1 | 9/2015 | Abe et al. | |
| 2015/0349638 A1* | 12/2015 | Sylla | H02M 3/158 307/10.1 |
| 2017/0373592 A1* | 12/2017 | Takahashi | H02M 3/156 |
| 2018/0234014 A1 | 8/2018 | Vadnerkar et al. | |
| 2018/0301905 A1* | 10/2018 | Dai | H02M 7/483 |
| 2018/0309372 A1 | 10/2018 | Leong et al. | |
| 2019/0181760 A1* | 6/2019 | Choi | H02M 1/08 |
| 2020/0153337 A1* | 5/2020 | Arduini | H02M 1/4241 |
| 2021/0376754 A1* | 12/2021 | Jang | H02M 1/0095 |

OTHER PUBLICATIONS

Dragan Maksimovic, et al. "Switching Converters with Wide DC Conversation Range," IEEE Transactions on Power Electronics, vol. 6, No. 1, pp. 151-157 (1991).

Dupont et al., "Reduced-Order Model and Control Approach for the Boost Converter With a Voltage Multiplier Cell", IEEE Transactions on Power Electronics, vol. 28, No. 7. Jul. 2013, 3395-3404.

Luo et al., "Positive output cascade boost converters", IEEE Proc.-Electr. Power Appl., vol. 151, No. 5, Sep. 2004, 590-606.

Ye et al., "Quadratic boost converter with low buffer capacitor stress", IET Power Electron., 2014, vol. 7, Iss. 5, pp. 1162-1170 doi:10.1049/iet-pel.2013.0205.

Miao et al., "A New Transformerless Buck-Boost Converter With Positive Output Voltage", IEEE Transactions on Industrial Electronics, vol. 63, No. 5, May 2016, 2965-2975.

Zhang et al., "A Single-Switch Quadratic Buck-Boost Converter With Continuous Input Port Current and Continuous Output Port Current", IEEE Transactions on Power Electronics, vol. 33, No. 5, May 2018, 4157-4166.

F. Wang, "A novel quadratic Boost converter with low current and voltage stress on power switch for fuel-cell system applications", Renewable Energy, 115 (2018), 836-845.

Wu et al., "Unified Approach to Developing Single-Stage Power Converters", IEEE Transactions on Aerospace and Electronics Systems, vol. 34, No. 1, Jan. 1998, 211-223.

Siddhartha et al., "Systematic circuit design and analysis of a non-ideal DC-DC pulse width modulation boost converter", IET Circuits Device Syst., 2018, vol. 12, Iss. 2, pp. 144-156.

* cited by examiner

SWITCHING REGULATOR AND POWER MANAGEMENT UNIT INCLUDING THE SAME

CROSS-REFERENCE TO RELATED APPLICATIONS

This application claims the benefit of Korean Patent Applications Nos. 10-2019-0032543 and 10-2019-0167142, respectively filed on Mar. 21, 2019 and Dec. 13, 2019, in the Korean Intellectual Property Office, the disclosures of each of which are incorporated herein in their entirety by reference.

BACKGROUND

Inventive concepts relate to a switching regulator configured to regulate an input voltage and generate an output voltage, and more particularly, to a power management unit including the switching regulator.

In general, a regulating circuit may be or include a circuit configured to convert power, which is input from the outside using power switches, into direct-current (DC) power, which is required/used by a system. Examples of a power regulator included in a regulator may include a DC-DC converter configured to boost or drop input DC power. The DC-DC converter may include a boost converter (or a step-up converter) configured to boost input DC power, a buck converter (or a step-down converter) configured to drop input DC power, and a buck-boost converter (or a step-up-step-down converter) configured to boost or drop input DC power.

SUMMARY

Inventive concepts provide a switching regulator having a high voltage gain by boosting an input voltage based on duty ratios of a plurality of switching signals and/or a power management unit including the switching regulator.

Inventive concepts also provide a switching regulator, which may adaptively determine a voltage gain order by controlling a duty ratio, and a power management unit including the switching regulator.

According to some example embodiments of inventive concepts, there is provided a switching regulator configured to transform an input voltage and to generate an output voltage, the switching regulator including a first regulating circuit configured to regulate the input voltage and to generate a first voltage based on a first switching signal set having a first duty ratio, and a second regulating circuit configured to regulate the first voltage and to generate the output voltage based on a second switching signal set having a second duty ratio. The switching regulator determines a voltage gain based on the first duty ratio and the second duty ratio, the voltage gain corresponding to a ratio of the output voltage to the input voltage.

According to some example embodiments of inventive concepts, there is provided a power management unit including control circuit configured to determine a first duty ratio and a second duty ratio based on a given voltage gain, to output a first switching signal set based on the first duty ratio, and to output a second switching signal set based on the second duty ratio, and a switching regulator configured to boost an input voltage to an output voltage based on the first switching signal set and the second switching signal set. The voltage gain corresponds to a ratio of the output voltage to the input voltage.

According to some example embodiments of inventive concepts, there is provided a switching regulator configured to regulate an input voltage and generate an output voltage, the switching regulator comprising a first switch between an input node and a first node, the input node configured to receive the input voltage, the first switch configured to receive a first switching signal having a first duty ratio, a second switch between the first node and a second node, a first inductor between the first node and a ground node, a first capacitor between the second node and the ground node, a third switch between the second node and a third node and configured to receive a second switching signal having a second duty ratio, a fourth switch between the third node and an output node, the output node configured to output the output voltage, a second inductor between the input node and the third node, and a second capacitor between the output node and the ground node.

BRIEF DESCRIPTION OF THE DRAWINGS

Embodiments of inventive concepts will be more clearly understood from the following detailed description taken in conjunction with the accompanying drawings in which.

DETAILED DESCRIPTION OF EXAMPLE EMBODIMENTS

Figure 1:
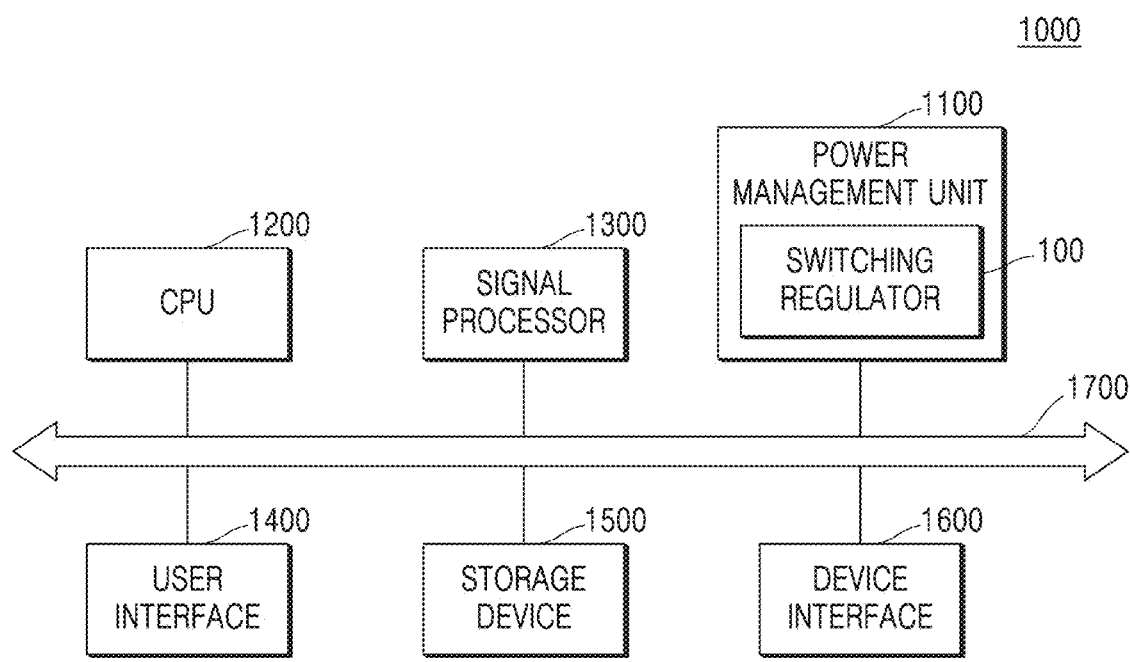
FIG. 1 a block diagram of an electronic device according to some example embodiments.

FIG. 1 is a block diagram of an electronic device 1000 according to some example embodiments.

Referring to FIG. 1, the electronic device 1000 may include a power management unit 1100, a central processing unit (CPU) 1200, a signal processor 1300, a user interface 1400, a storage unit/storage device 1500, a device interface 1600, and/or a bus 1700.

The electronic device 1000 may include a semiconductor chip, a semiconductor device, a semiconductor package, a semiconductor module, a semiconductor system, and/or a System-on-Chip (SoC). Alternatively or additionally, the electronic device 1000 may include various electronic systems including a switching regulator 100. As an example, the electronic device 1000 may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MPEG-1 audio layer 3 (MP3) player, mobile medical equipment, a camera, a wearable device, an eco-friendly energy generating device, a data center, or a light-emitting diode (LED) drive apparatus.

The power management unit 1100 may generate a power supply voltage required by or used by the electronic device 1000, and may supply the power supply voltage to some or all of the components. The power management unit 1100 may include the switching regulator 100, which may serve as a direct current-direct current (DC-DC) converter. The switching regulator 100 according to some example embodiments may include a plurality of regulating circuits, which may respectively operate based on switching signals having different duty ratios.

The switching regulator 100 according to some example embodiments may enable improved/optimum design and control of a system using a high degree of freedom of the adjustment of a duty ratio. The switching regulator 100 may regulate an input voltage using the duty ratio and may adjust in real-time to not only static characteristics (e.g., efficiency and/or device rating) but also dynamic characteristics (e.g., a response speed).

In addition, the switching regulator 100 according to some example embodiments may enable several combinations of duty ratios to achieve the same voltage gain. Thus, the switching regulator 100 may have improved/optimum power consumption and improved/optimum voltage and current ratings, which are related to devices used for a system. Since not only static gains, such as the power consumption and the voltage and current ratings, but also a dynamic response speed of a boost stage may be controlled, the switching regulator 100 may have a small output voltage ripple and/or a high response speed according to changes in environment, a load current, and/or an output voltage.

In some example embodiments, a switching regulator may be proposed, the switching regulator having a positive output voltage applicable to an application requiring or using a wide range of voltage gain. By using a switch network called duty modulation, the proposed switching regulator may achieve a high boost gain under low current stress while maintaining high efficiency. The duty modulation may be used for both static system improvement/optimization and dynamic system optimization. The static system improvement/optimization may include power loss improvement/optimization and voltage/current rating improvement/optimization, which are closely related to cost and size. The dynamic system improvement/optimization may be required or used for a fast loop response of a system. The duty modulation according to some example embodiments may enable modulation of a zero position in the system, thus enabling an adaptive system response.

The CPU 1200 may perform an operation of generally controlling the electronic device 1000. As an example, the CPU 1200 may control components of the electronic device 1000 based on information input through the user interface 1400. The signal processor 1300 may process a signal received through the device interface 1600 or a signal read from the storage device 1500 according to a predetermined standard. As an example, the signal processor 1300 may process video signals and/or audio signals.

The user interface 1400 may serve as an input device, which enables a user to set information required/used for function setting and operations of the electronic device 1000. The storage device 1500 may store various pieces of information required/used for operations of the electronic device 1000. Alternatively or additionally, the storage device 1500 may store data received through the device interface 1600 or data processed by the electronic device 1000. The device interface 1600 may communicate data with an external device connected to the electronic device 1000 by wire or wirelessly. The bus 1700 may transmit information between components of the electronic device 1000.

Figure 2:
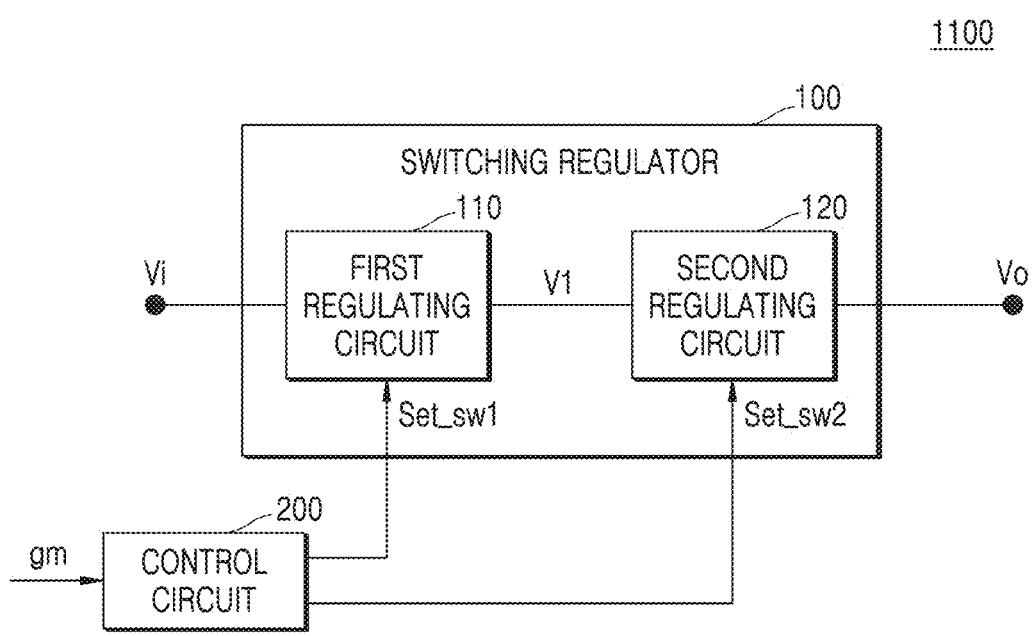
FIG. 2 is a block diagram of a power management unit according to some example embodiments.

FIG. 2 is a block diagram of a power management unit 1100 according to some example embodiments.

Referring to FIG. 2, the power management unit 1100 may include a switching regulator 100 and a control circuit 200, and the switching regulator 100 may include a first regulating circuit 110 and a second regulating circuit 120. In some example embodiments, the first regulating circuit 110 may include a buck-boost converter and/or a negative buck-boost converter, and the second regulating circuit 120 may include a boost converter.

The first regulating circuit 110 may receive a first switching signal set Set_sw1 from the control circuit 200, regulate an input voltage Vi based on the first switching signal set Set_sw1, and generate a first voltage V1. The second regulating circuit 120 may receive a second switching signal set Set_sw2 from the control circuit 200, regulate the first voltage V1 based on the second switching signal set Set_sw2, and generate an output voltage Vo.

According to some example embodiments, the first switching signal set Set_sw1 and the second switching signal set Set_sw2 may have different duty ratios. In some example embodiments, the first switching signal set Set_sw1 may include a first switching signal having a first duty ratio, and the first regulating circuit 110 may regulate the input voltage Vi based on the first switching signal and generate the first voltage V1. The second switching signal set Set_sw2 may include a second switching signal having a second duty ratio, and the second regulating circuit 120 may regulate the first voltage V1 based on the second switching signal and generate the output voltage Vo.

Alternatively or additionally, in some example embodiments the first switching signal set Set_sw1 may include the first switching signal having the first duty ratio and a third switching signal having a voltage level that is complementary to the first switching signal. The first regulating circuit 110 may regulate the input voltage Vi based on the first switching signal and the third switching signal, and may generate the first voltage V1. The second switching signal set Set_sw2 may include the second switching signal having the second duty ratio and a fourth switching signal having a voltage level that is complementary to the second switching signal. The second regulating circuit 120 may regulate the first voltage V1 based on the second switching signal and the fourth switching signal, and may generate the output voltage Vo.

The control circuit 200 may receive a required/specified voltage gain gm, and may output the first switching signal set Set_sw1 and the second switching signal set Set_sw2 to the switching regulator 100 based on the voltage gain gm. In some example embodiments, the voltage gain gm may be generated to correspond to the required/specified output voltage Vo, and the control circuit 200 may receive the voltage gain gm from the CPU 1200 of FIG. 1.

In some example embodiments, the control circuit 200 may generate the first switching signal set Set_sw1 and the second switching signal set Set_sw2 based on the required/specified voltage gain gm. In some examples, the control circuit 200 may generate the first duty ratio of the first switching signal set Set_sw1, and may generate the second duty ratio of the second switching signal set Set_sw2 based on the voltage gain gm.

According to inventive concepts, the control circuit 200 may determine the first duty ratio of the first switching signal set Set_sw1 and the second duty ratio of the second switching signal set Set_sw2 based on the voltage gain gm, and a plurality of regulating circuits (e.g., 110 and 120) may generate an output voltage based on a plurality of switching signal sets (e.g., the first and second switching signal sets Set_sw1 and Set_sw2) having different duty ratios. Thus, the switching regulator 100 may ensure a high voltage gain gm.

Figure 3:
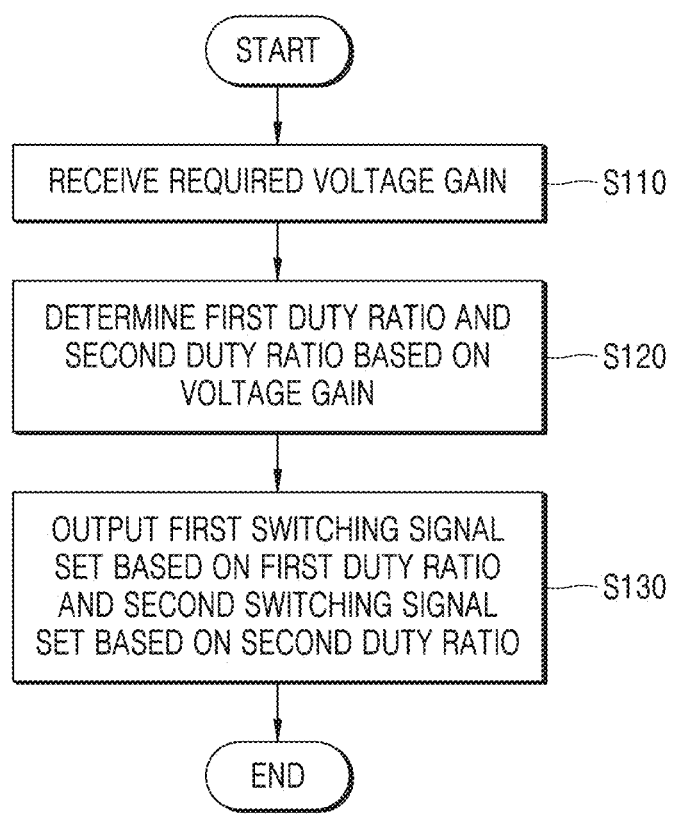
FIG. 3 is a flowchart of an operation of a control circuit according to some example embodiments.

FIG. 3 is a flowchart of an operation of a control circuit 200 according to some example embodiments.

Referring to FIGS. 2 and 3, the control circuit 200 may receive a required/given voltage gain gm (S110). The control circuit 200 may determine a first duty ratio of a first switching signal set Set_sw1 output to a first regulating circuit 110 and a second duty ratio of a second switching signal set Set_sw2 output to a second regulating circuit 120, based on the voltage gain gm (S120). In an example, the control circuit 200 may determine the first duty ratio and the second duty ratio using a predetermined (or, alternatively, variable) formula.

The control circuit 200 may output the first switching signal set Set_sw1, which is generated based on the first duty ratio, to the first regulating circuit 110, and may output the second switching signal set Set_sw2, which is generated based on the second duty ratio, to the second regulating circuit 120.

The control circuit 200 according to some example embodiments may determine the first duty ratio and the second duty ratio using a predetermined/specific formula for calculating the voltage gain gm. Since the voltage gain gm is determined only using the first duty ratio and the second duty ratio, the switching regulator 100 may freely determine the voltage gain gm.

Figure 4:
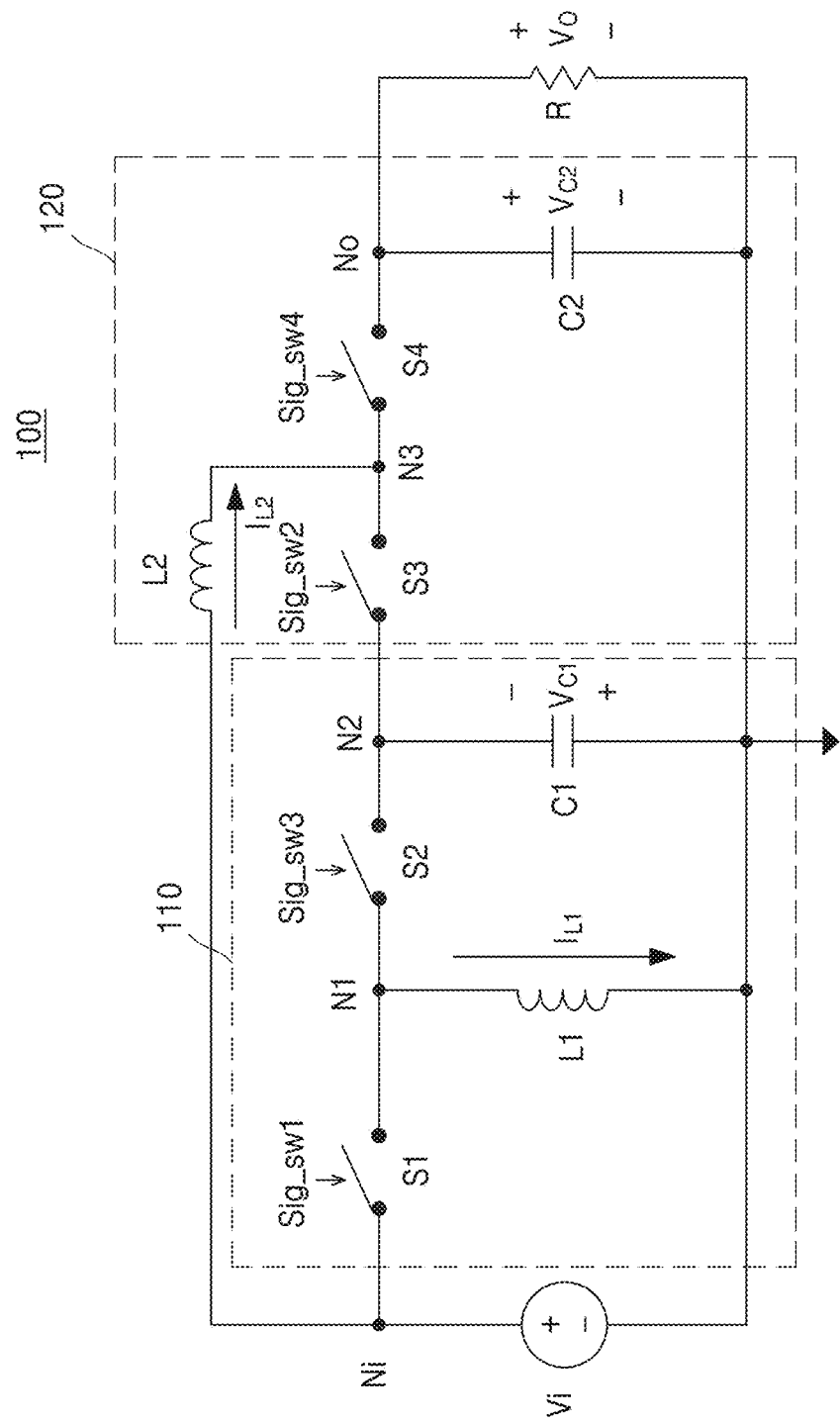
FIG. 4 is a circuit diagram of a switching regulator according to some example embodiments.

FIG. 4 is a circuit diagram of a switching regulator 100 according to some example embodiments.

Referring to FIG. 4, the switching regulator 100 may include a first regulating circuit 110 and a second regulating circuit 120. The first regulating circuit 110 may include a first switch S1, a second switch S2, a first inductor L1, and a first capacitor C1. The first switch Si may be connected between, e.g. directly connected between an input node Ni to which an input voltage Vi is applied and a first node N1, and may switch between the input node Ni and the first node N1 based on a first switching signal Sig_sw1. The second switch S2 may be connected between, e.g. directly connected between the first node N1 and a second node N2, and may switch between the first node N1 and the second node N2 based on a third switching signal Sig_sw3. In some example embodiments, the third switching signal Sig_sw3 may have a voltage level that is complementary to a voltage level of the first switching signal Sig_sw1. In some examples, the first switching signal Sig_sw1 and the third switching signal Sig_sw3 may be included in the first switching signal set Set_sw1 of FIG. 2.

The first inductor L1 may be connected between, e.g. directly connected between the first node N1 and a ground node, and a first inductor current $I_{L1}$ may flow through the first inductor L1. The first capacitor C1 may be connected between, e.g. directly connected between the second node N2 and the ground node, and a first capacitor voltage $V_{C1}$ may be applied to the first capacitor C1 based on the second node N2.

The first regulating circuit 110 may include the first switch S1, the second switch S2, the first inductor L1, and the first capacitor C1 and thus, constitute or correspond to a buck-boost converter and/or a negative buck-boost converter. The first regulating circuit 110 may boost or drop the input voltage Vi according to on-off ratios of the first switch Si and the second switch S2. As a result, the first regulating circuit 110 may apply a first voltage V1 to the second node N2. The on-off ratios of the first switch Si and the second switch S2 may be determined based on a first duty ratio, which corresponds to a ratio of '1' (high voltage) to '0' (low voltage) of the first switching signal Sig_sw1 (or the third switching signal Sig_sw3 that is complementary to the first switching signal Sig_sw1).

The second regulating circuit 120 may include a third switch S3, a fourth switch S4, a second inductor L2, and a second capacitor C2. The third switch S3 may be connected between, e.g. directly connected between the second node N2 to which the first voltage V1 is applied and a third node N3, and may switch between the second node N2 and the third node N3 based on the second switching signal Sig_sw2. The fourth switch S4 may be connected between, e.g. directly connected between the third node N3 and an output node No, and may switch between the third node N3 and the output node No based on a fourth switching signal Sig_sw4. In some example embodiments, the fourth switching signal Sig_sw4 may have a voltage level that is complementary to the second switching signal Sig_sw2. In an example, the second switching signal Sig_sw2 and the fourth switching signal Sig_sw4 may be included in the second switching signal set Set_sw2 of FIG. 2.

The second inductor L2 may be connected between, e.g. directly connected between the input node Ni and the third node N3, and a second inductor current $I_{L2}$ may be supplied to the second inductor L2. The second capacitor C2 may be connected between, e.g. directly connected between the output node No and the ground node, and a second capacitor voltage $V_{C2}$ may be applied to the second capacitor C2 based on the ground node.

The second regulating circuit 120 may include the third switch S3, the fourth switch S4, the second inductor L2, and the second capacitor C2 and constitute/correspond to a boost converter. The second regulating circuit 120 may boost the first voltage V1 according to on-off ratios of the third switch S3 and the fourth switch S4. As a result, the second regulating circuit 120 may apply an output voltage Vo to the output node No. The on-off ratios of the third switch S3 and the fourth switch S4 may be determined based on a second duty ratio, which corresponds to a ratio of '1' (high voltage) to '0' (low voltage) of the second switching signal Sig_sw2 (or the fourth switching signal Sig_sw4 that is complementary to the second switching signal Sig_sw2).

The switching regulator 100 according to some example embodiments may modulate a boost stage with a negative voltage using a two-stage modulation process, and thus the switching regulator 100 may improve a voltage gain and operate in a stable duty range.

Figure 5A:
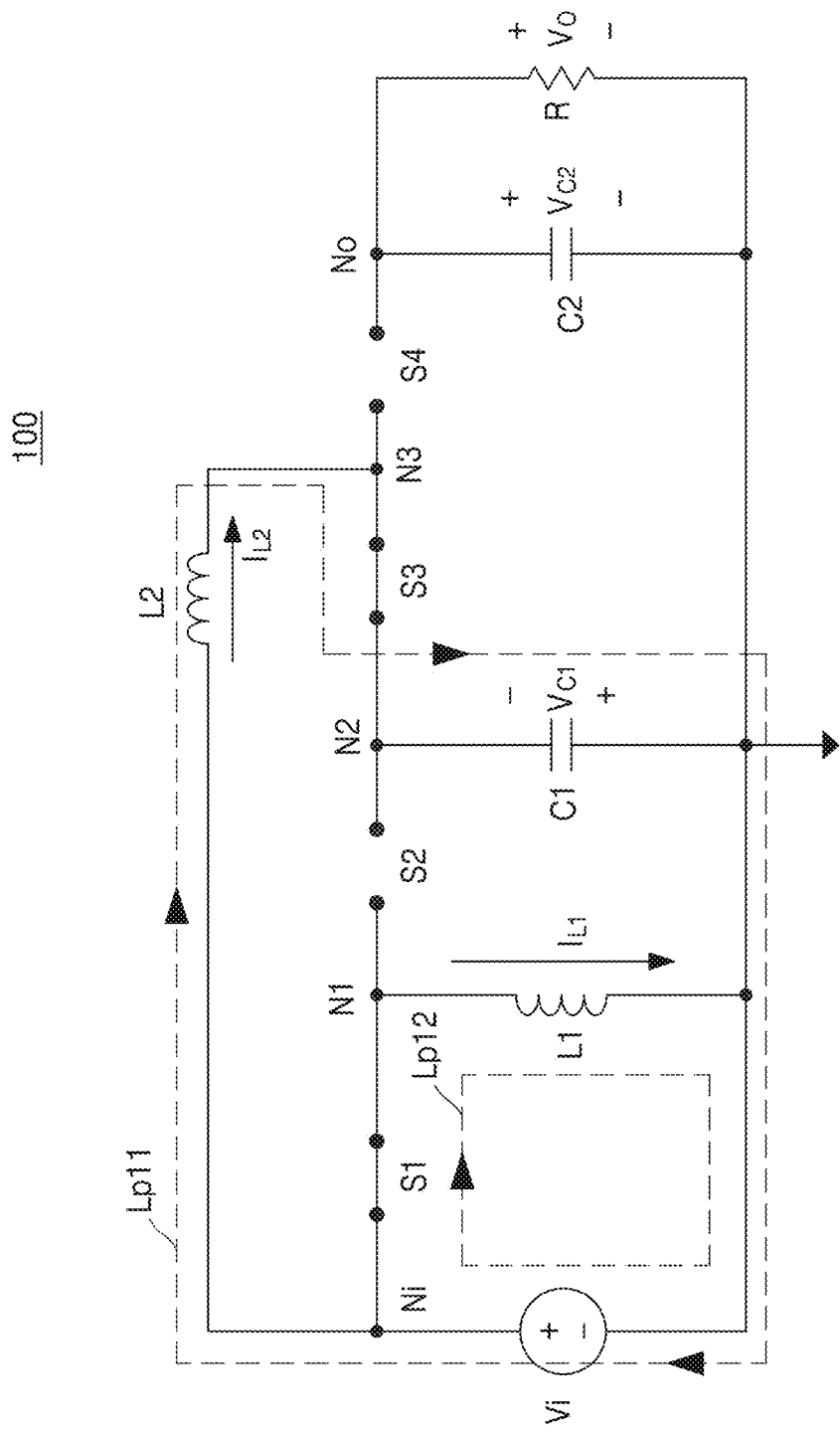
FIGS. 5A to 5C are circuit diagrams of a switching regulator according to some example embodiments.
Figure 5B:
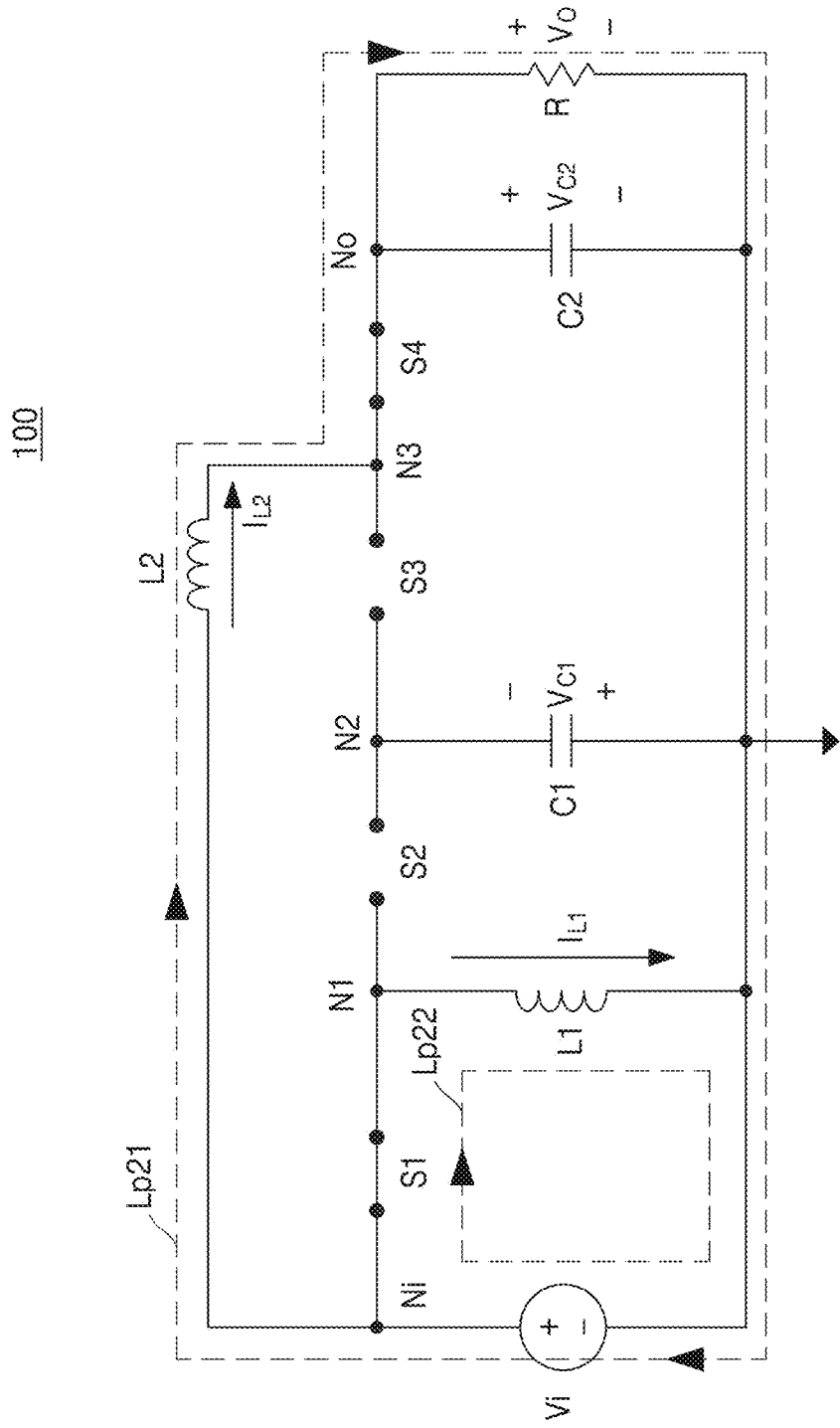
Figure 5C:
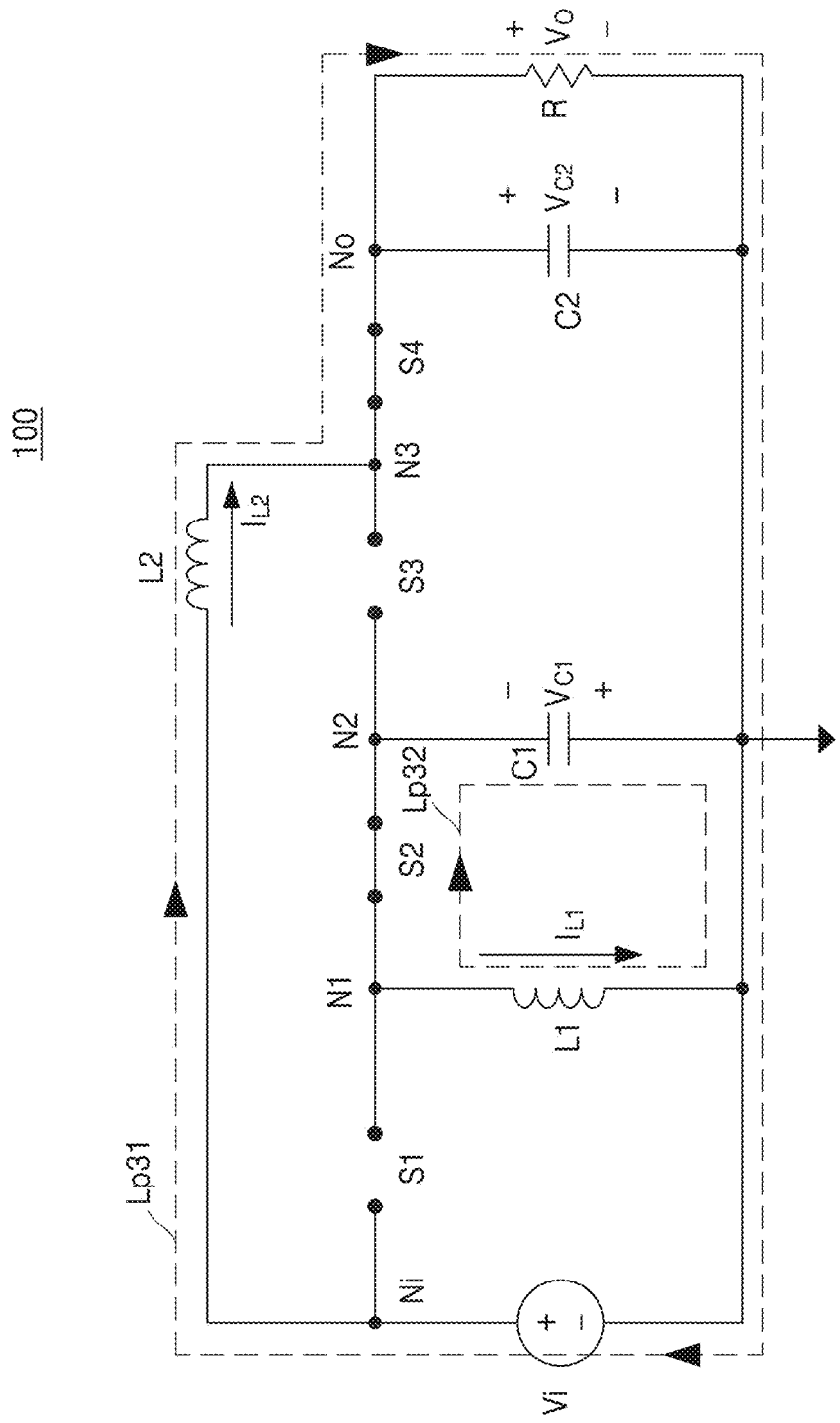

FIGS. 5A to 5C are circuit diagrams of a switching regulator 100 according to some example embodiments. Specifically, FIGS. 5A to 5C are circuit diagrams of the switching regulator 100 depending on whether a plurality of switches (e.g., first to fourth switches Si to S4) are turned on and off in different modes.

Referring to FIG. 5A, when the switching regulator 100 is in a first mode, the first switch Si and the third switch S3 may be closed, while the second switch S2 and the fourth switch S4 may be opened. Accordingly, the switching regulator 100 may include two closed loops, namely, first and second loops Lp11 and Lp12.

When Kirchhoff's voltage law (KVL) is applied to the first loop Lp11 and the second loop Lp12 and Kirchhoff's current law (KCL) is applied to a second node N2 and an output node No, the following Equation 1 may be obtained. In Equation 1, $L_1$ denotes an inductance of a first inductor L1, $L_2$ denotes an inductance of a second inductor L2, $C_1$ denotes a capacitance of a first capacitor C1, $C_2$ denotes a capacitance of a second capacitor $C_2$, and other symbols are the same as described above with reference to FIG. 4.

$$\begin{cases} L_2 \frac{d}{dt} I_{L2} = V_i + V_{C1} \text{ (by } KVL \text{ on } Lp11) \\ L_1 \frac{d}{dt} I_{L1} = V_i \text{ (by } KVL \text{ on } Lp12) \\ C_1 \frac{d}{dt} V_{C1} = -I_{L2} \text{ (by } KCL \text{ on } N2) \\ C_2 \frac{d}{dt} V_{C2} = -\frac{V_o}{R} \text{ (by } KCL \text{ on } No) \end{cases}$$ [Equation 1]

Referring to FIG. 5B, when the switching regulator 100 is in a second mode, the first switch S1 and the fourth switch S4 may be closed, while the second switch S2 and the third switch S3 may be opened. Accordingly, the switching regulator 100 may include two closed loops, namely, third and fourth closed loops Lp21 and Lp22.

When the KVL is applied to the third loop Lp21 and fourth loop Lp22 and the KCL is applied to the second node N2 and the output node No, the following Equation 2 may be obtained.

$$\begin{cases} L_2 \frac{d}{dt} I_{L2} = V_i - V_o \text{ (by } KVL \text{ on } Lp21) \\ L_1 \frac{d}{dt} I_{L1} = V_i \text{ (by } KVL \text{ on } Lp22) \\ C_1 \frac{d}{dt} V_{C1} = 0 \text{ (by } KCL \text{ on } N2) \\ C_2 \frac{d}{dt} V_{C2} = I_{L2} - \frac{V_o}{R} \text{ (by } KCL \text{ on } No) \end{cases}$$ [Equation 2]

Referring to FIG. 5C, when the switching regulator 100 in a third mode, the second switch S2 and the fourth switch S4 may be closed, and the first switch S1 and the third switch S3 may be opened. Accordingly, the switching regulator 100 may include two closed loops, namely, fifth and sixth closed loops Lp31 and Lp32.

When the KVL is applied the fifth loop Lp31 and the sixth loop Lp32 and the KCL is applied to the second node N2 and the output node No, the following Equation 3 may be obtained.

$$\begin{cases} L_2 \frac{d}{dt} I_{L2} = V_i + V_o \text{ (by } KVL \text{ on } Lp31) \\ L_1 \frac{d}{dt} I_{L1} = -V_{C1} \text{ (by } KVL \text{ on } Lp32) \\ C_1 \frac{d}{dt} V_{C1} = I_{L1} \text{ (by } KCL \text{ on } N2) \\ C_2 \frac{d}{dt} V_{C2} = I_{L2} - \frac{V_o}{R} \text{ (by } KCL \text{ on } No) \end{cases}$$ [Equation 3]

In Equations 1 to 3, when the volt-second balance principle is applied to the first inductor L1 and the second inductor L2 during one cycle, the following Equation 4 may be obtained. In Equation 4, $d_1$ may be or correspond to a first duty ratio of a first switching signal Sig_sw1, namely, a ratio of on-period to off-period of the first switch S1, and $d_1'$ may be or correspond to $1-d_1$. Also, $d_2$ may be or correspond to a second duty ratio of a second switching signal Sig_sw2, namely, a ratio of on-period to off-period of the third switch S3, and $d_2'$ may be or correspond to $1-d_2$.

$$\begin{cases} L_2 \frac{d}{dt} I_{L2} = V_{C1} d_2 + V_i - V_o d_2' = 0 \\ L_1 \frac{d}{dt} I_{L1} = V_i d_1 - V_{C1} d_1' = 0 \end{cases}$$ [Equation 4]

By merging two equations of Equation 4, Equation 5 for a voltage gain may be obtained as follows. In the following Equation 5, $g_m$ denotes the voltage gain.

$$g_m = \frac{V_o}{V_i} = \frac{d_1' + d_1 d_2}{d_1' d_2'} = \frac{1 - d_1 + d_1 d_2}{(1-d_1)(1-d_2)}$$ [Equation 5]

The voltage gain $g_m$ may be obtained as shown in the following Equation 6 in consideration of a first parasitic resistance $R_{L1}$ (not shown) of the first inductor L1, a second parasitic resistance $R_{L2}$ (not shown) of the second inductor L2, and a resistance R of a load.

$$g_m = \frac{V_o}{V_i} = \frac{d_1' + d_1 d_2}{d_1' d_2' + \frac{d_1' R_{L1}}{R d_2'} + \frac{d_2^2 R_{L2}}{R d_1' d_2'}}$$ [Equation 6]

Referring to FIGS. 4 to 5C, the voltage gain of the switching regulator 100 according to some example embodiments may be determined by the first duty ratio $d_1$ of the first switching signal Sig_sw1 and the second duty ratio $d_2$ of the second switching signal Sig_sw2. Since a duty ratio may be freely determined by a control circuit (refer to 200 in FIG. 2), the voltage gain of the switching regulator 100 may be adaptively controlled by controlling the first duty ratio $d_1$ and the second duty ratio $d_2$.

Figure 6:
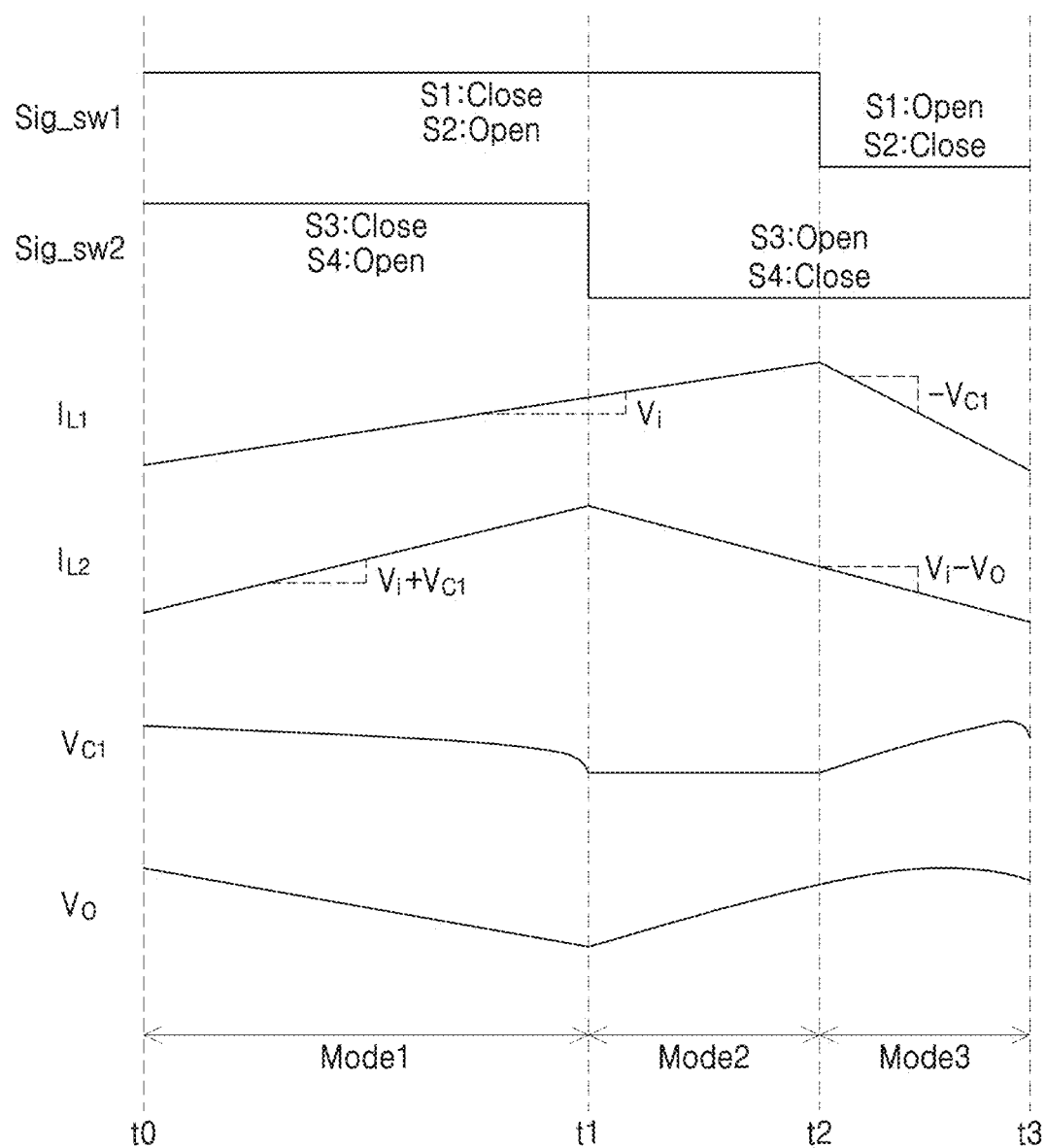
FIG. 6 is a timing diagram of an operation of a switching regulator according to some example embodiments.

FIG. 6 is a timing diagram of an operation of a switching regulator 100 according to some example embodiments. Specifically, FIG. 6 illustrates an operation of the switching regulator 100 in a steady state.

Referring to FIGS. 4 and 6, in a time period from a first time point t0 to a second time point t1, the switching regulator 100 may operate in a first mode Mode1. In the first mode Mode1, a logic high (or '1') may be applied as a first switching signal Sig_sw1 to the switching regulator 100, and a logic high (or '1') may be applied as a second switching signal Sig_sw2 to the switching regulator 100. Accordingly, a first switch S1 and a third switch S3 may be closed, a second switch S2, which operates complementarily to the first switch S1, may be opened, and a fourth switch S4, which operates complementarily to the third switch S3, may be opened.

According to Equation 1 described above with reference to FIG. 5A, a first inductor current $I_{L1}$ may increase with a slope proportional to an input voltage Vi, and a second inductor current $I_{L2}$ may increase with a slope proportional to the sum $V_i + V_{C1}$ of the input voltage Vi and a first capacitor voltage $V_{C1}$. The first capacitor voltage $V_{C1}$ may be gradually reduced as charges accumulated in a first capacitor C1 are lost through the second inductor current $I_{L2}$. Accordingly, the output voltage Vo may also be gradually reduced.

In a time period from the second time point t1 to a third time point t2, the switching regulator 100 may operate in a second mode Mode2. In the second mode Mode2, a logic high (or '1') may be applied to the switching regulator 100, as the first switching signal Sig_sw1 and a logic low (or '0') may be applied to the switching regulator 100 as the second switching signal Sig_sw2. Accordingly, the first switch S1 may be closed, the second switch S2 which operates complementarily to the first switch S1, may be opened, the third switch S3 may be opened, and the fourth switch S4 which operates complementarily to the third switch S3, may be closed.

According to Equation 2 described above with reference to FIG. 5B, the first inductor current $I_{L1}$ may increase with a slope proportional to the input voltage Vi, and the second inductor current $I_{L2}$ may be reduced with a slope proportional to a difference (Vi–Vo) between the input voltage Vi and an output voltage Vo. The first capacitor voltage $V_{C1}$ may maintain a voltage level when the second switch S2 and the third switch S3 are opened. The output voltage Vo may increase with an increase in the first inductor current $I_{L1}$.

In a time period from the third time point t2 to a fourth time point t3, the switching regulator 100 may operate in a third mode Mode3. In the third mode Mode3, a logic low (or '0') may be applied sw1 to the switching regulator 100 as the first switching signal Sig_, and a logic low (or '0') may be applied to the switching regulator 100 as the second switching signal Sig_sw2. Accordingly, the first switch S1 may be opened, the second switch S2 which operates complementarily to the first switch S1, may be closed, the third switch S3 may be opened, the fourth switch S4 which operates complementarily to the third switch S3, may be closed.

According to Equation 3 described above with reference to FIG. 5C, the first inductor current $I_{L1}$ may be reduced with a slope proportional to the first capacitor voltage $V_{C1}$, and the second inductor current $I_{L2}$ may be reduced with a slope proportional to the difference (Vi–Vo) between the input voltage Vi and the output voltage Vo. As the first capacitor voltage $V_{C1}$ is charged with the first inductor current $I_{L1}$, a voltage level of the first capacitor voltage $V_{C1}$ may increase, and a slope of the output voltage Vo may be gradually reduced with a reduction of the first inductor current $I_{L1}$.

Although FIG. 6 illustrates an example in which the switching regulator 100 operates using three modes, namely, the first to third modes Mode1, Mode2, and Mode3, inventive concepts are not limited thereto. For example, the switching regulator 100 may operate using four modes that further include a fourth mode in which the first switching signal Sig_sw1 is at a logic low (e.g., '0') and the second switching signal Sig_sw2 is at a logic high (e.g., '1'). Still further, the switching regulator 100 may operate using any three modes out of the first to third modes Mode1, Mode2, and Mode3, and the fourth mode.

Figure 7:
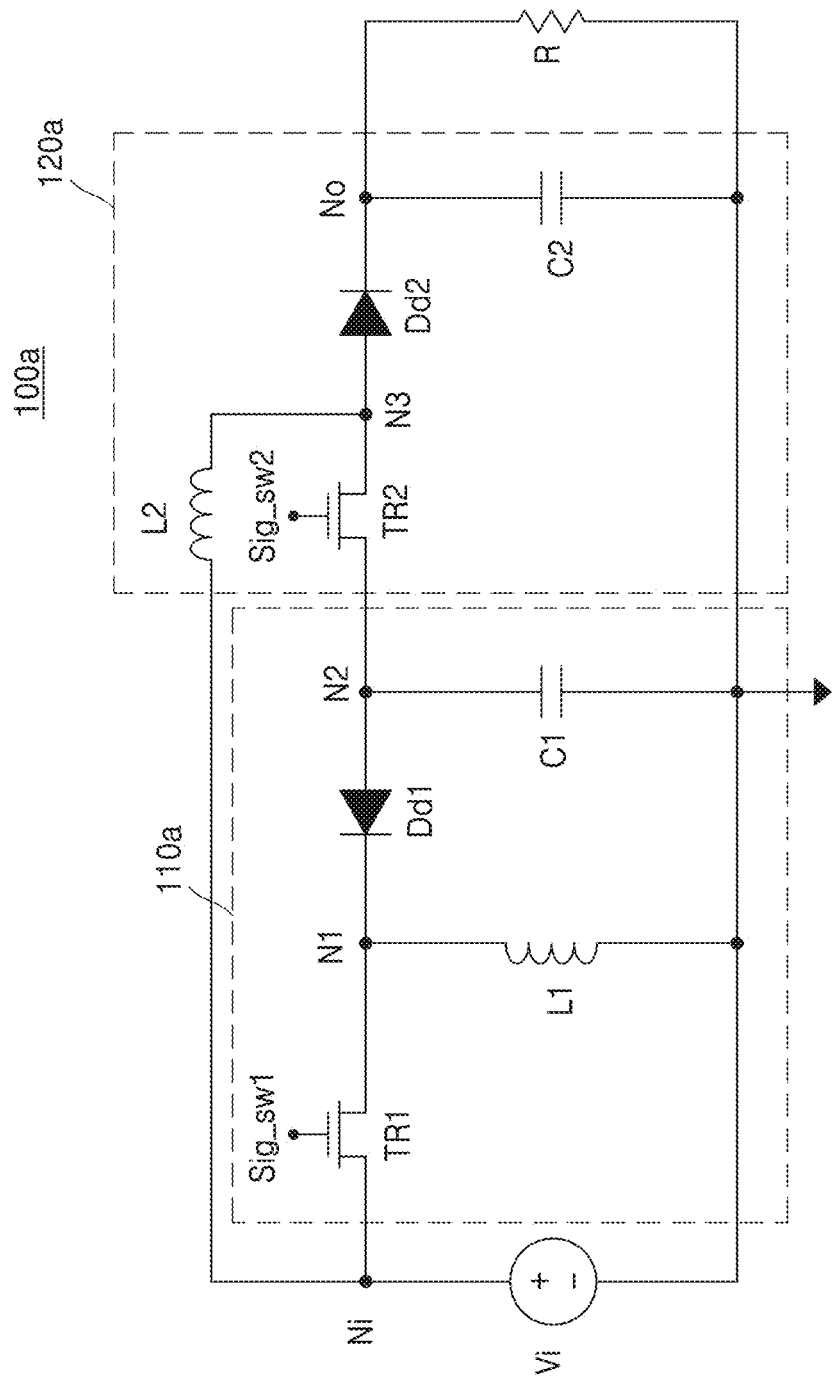
FIG. 7 is a circuit diagram of a switching regulator according to some example embodiments.

FIG. 7 is a circuit diagram of a switching regulator 100a according to some example embodiments. Specifically, FIG. 7 illustrates an example in which a regulating circuit includes an asynchronous converter. The same description as in FIG. 4 will be omitted.

Referring to FIG. 7, the switching regulator 100a may include a first regulating circuit 110a and a second regulating circuit 120a. The first regulating circuit 110a may include a first transistor TR1, a first diode Dd1, a first inductor L1, and a first capacitor C1. Although FIG. 7 illustrates that first transistor TR1 is an NMOS transistor, example embodiments are not limited thereto.

The first transistor TR1 may have a source terminal connected to (e.g. directly connected to) an input node Ni, a drain terminal connected to (e.g. directly connected to) a first node N1, and a gate terminal to which a first switching signal Sig_sw1 may be applied. The first diode Dd1 may have an input terminal connected to (e.g. directly connected to) a second node N2 and an output terminal connected to (e.g. directly connected to) the first node N1.

When the first transistor TR1 is turned on in response to the first switching signal Sig_sw1, current may be applied to the first inductor L1 through a branch connected between, e.g. directly connected between the input node Ni and the first node N1. Depending on the connection of the first diode Dd1, current from the first node N1 to the second node N2 may be cut off, and a connection between the first node N1 and the second node N2 may be in an open state.

When the first transistor TR1 is turned off in response to the first switching signal Sig_sw1, a connection between the input node Ni and the first node N1 may be opened. Depending on the connection of the first diode Dd1, current may be applied to the first inductor L1 through a branch connected between, e.g. directly connected between the second node N2 and the first node N1, and a connection between the first node N1 and the second node N2 may be in a closed state.

The second regulating circuit 120a may include a second transistor TR2, a second diode Dd2, a second inductor L2, and a second capacitor C2. The second transistor TR2 may have a source terminal connected to (e.g. directly connected to) a third node N3, a drain terminal connected to (e.g. directly connected to) the second node N2, and a gate terminal to which a second switching signal Sig_sw2 may be applied. The second diode Dd2 may have an input terminal connected to (e.g. directly connected to) the third node N3 and an output terminal connected to the output node No. Although FIG. 7 illustrates that second transistor TR2 is an NMOS transistor, example embodiments are not limited thereto.

When the second transistor TR2 is turned on in response to the second switching signal Sig_sw2, current may be drawn from the second inductor L2 through a branch connected between, e.g. directly connected between the third node N3 and the second node N2. Depending on the connection of the second diode Dd2, current from the output node No to the third node N3 may be cut off, and a connection between the output node No and the third node N3 may be in an open state.

When the second transistor TR2 is turned off in response to the second switching signal Sig_sw2, a connection between the third node N3 and the second node N2 may be opened. Depending on the connection of the second diode Dd2, current may be drawn from the second inductor L2 through a branch connected between, e.g. directly connected between the third node N3 and the output node No, and a connected between, e.g. directly connected between the third node N3 and the output node No may be in a closed state.

According to some example embodiments, since the first switch S1 of FIG. 4 is implemented as the first transistor TR1 and the second switch S2 of FIG. 4 is implemented as first diode Dd1, the first switch S1 and the second switch S2 may enable complementary operations. Since the third switch S3 is implemented as the second transistor TR2 and the fourth switch S4 is implemented as the second diode Dd2, the third switch S3 and fourth switch S4 may enable complementary operations.

Figure 8:
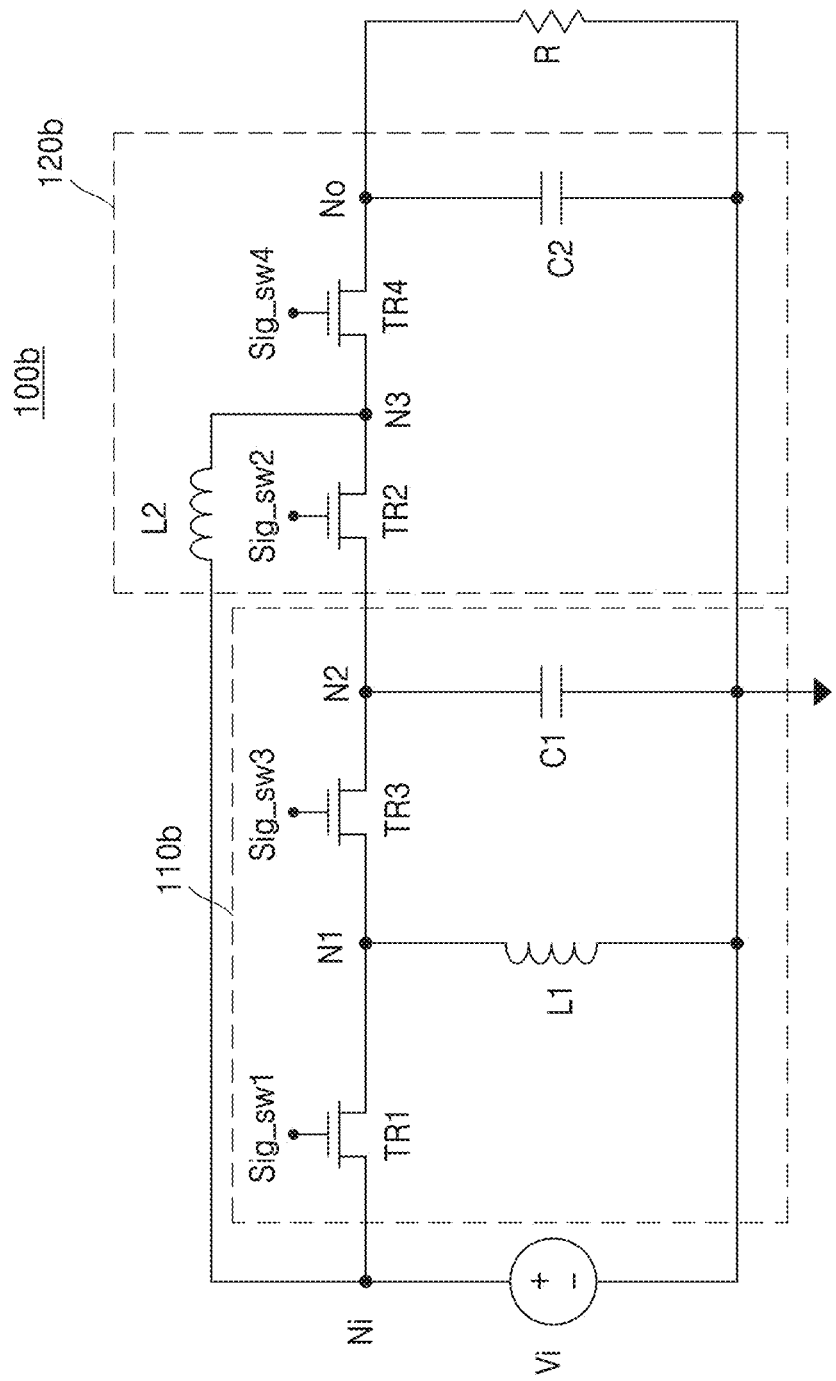
FIG. 8 is a circuit diagram of a switching regulator according to some example embodiments.

FIG. 8 is a circuit diagram of a switching regulator 100b according to some example embodiments. Specifically, FIG. 8 illustrates an example in which a regulating circuit includes a synchronous converter. The same description as in FIG. 4 will be omitted.

Referring to FIG. 8, the switching regulator 100b may include a first regulating circuit 110b and a second regulating circuit 120b, and the first regulating circuit 110b may include a first transistor TR1, a third transistor TR3, a first inductor L1, and a first capacitor C1. Although FIG. 8 illustrates that both first transistor TR1 and third transistor TR3 are NMOS transistors, example embodiments are not limited thereto.

The first transistor TR1 may have a source terminal connected to an input node Ni, a drain terminal connected to a first node N1, and a gate terminal to which a first switching signal Sig_sw1 may be applied. The third transistor TR3 may have a source terminal connected to a second node N2, a drain terminal connected to the first node N1, and a gate terminal to which a third switching signal Sig_sw3 may be applied. The third switching signal Sig_sw3 may have a logic level that is complementary to the first switching signal Sig_sw1.

When the first transistor TR1 is turned on in response to the first switching signal Sig_sw1, since the third switching signal Sig_sw3 has the logic level that is complementary to the first switching signal Sig_sw1, the third transistor TR3 may be turned off. In this case, a connection between the input node Ni and the first node N1 may be closed, and a connection between the first node N1 and the second node N2 may be opened. Accordingly, current may be applied to the first inductor L1 through a branch connected between, e.g. directly connected between the input node Ni and the first node N1.

When the first transistor TR1 is turned off in response to the first switching signal Sig_sw1, since the third switching signal Sig_sw3 has a logic level that is complementary to the first switching signal Sig_sw1, the third transistor TR3 may be turned on. In this case, a connection between the input node Ni and the first node N1 may be opened, and a connection between the first node N1 and the second node N2 may be closed. Accordingly, current may be applied to the first inductor L1 through a branch connected between, e.g. directly connected between the first node N1 and the second node N2.

The second regulating circuit 120b may include a second transistor TR2, a fourth transistor TR4, a second inductor L2, and a second capacitor C2. The second transistor TR2 may have a source terminal connected to a third node N3, a drain terminal connected to the second node N2, and a gate terminal to which a second switching signal Sig_sw2 may be applied. The fourth transistor TR4 may have a source terminal connected to the third node N3, a drain terminal connected to an output node No, and a gate terminal to which a fourth switching signal Sig_sw4 may be applied. The fourth switching signal Sig_sw4 may have a logic level that is complementary to the second switching signal Sig_sw2. Although FIG. 8 illustrates that second transistor TR2 and fourth transistor TR4 are NMOS transistors, example embodiments are not limited thereto.

When the second transistor TR2 is turned on in response to the second switching signal Sig_sw2, since the fourth switching signal Sig_sw4 has a logic level that is complementary to the second switching signal Sig_sw2, the fourth transistor TR4 may be turned off. In this case, a connection between the third node N3 and the second node N2 may be closed, and a connection between the third node N3 and the output node No may be opened. Accordingly, current may be drawn from the second inductor L2 through a branch connected between, e.g. directly connected between the third node N3 and the second node N2.

When the second transistor TR2 is turned off in response to the second switching signal Sig_sw2, since the fourth switching signal Sig_sw4 has a logic level that is complementary to the second switching signal Sig_sw2, the fourth transistor TR4 may be turned on. In this case, a connection between the third node N3 and the second node N2 may be opened, and a connection between the third node N3 and the output node No may be closed. Accordingly, current may be drawn from the second inductor L2 through a branch connected between, e.g. directly connected between the third node N3 and the output node No.

According to some example embodiments, the first switch S1 of FIG. 4 may be implemented as the first transistor TR1, the second switch S2 of FIG. 4 may be implemented as the third transistor TR3, and the third switching signal Sig_sw3 may have a logic level that is complementary to the first switching signal Sig_sw1, and thus, the first switch S1 and the second switch S2 may enable complementary operations. Also, the third switch S3 of FIG. 4 may be implemented as the second transistor TR2, the fourth switch S4 of FIG. 4 may be implemented as the fourth transistor TR4, and the fourth switching signal Sig_sw4 may have a logic level that is complementary to the second switching signal Sig_sw2, and thus, the third switch S3 and the fourth switch S4 may enable complementary operations.

FIG. 7 illustrates some example embodiments in which each of the first regulating circuit 110a and the second regulating circuit 120a includes an asynchronous converter including one transistor and one diode. Also, FIG. 8 illustrates some example embodiments in which each of the first regulating circuit 110b and the second regulating circuit 120b includes a synchronous converter including two transistors. However, inventive concepts is not limited to the embodiments shown in FIGS. 7 and 8. In some example embodiments, a first regulating circuit and a second regulating circuit may include different types of converters.

In an example, the first regulating circuit may include an asynchronous converter, and the second regulating circuit may include a synchronous converter. In another example, the first regulating circuit may include a synchronous converter, and the second regulating circuit may include an asynchronous converter.

Figure 9:
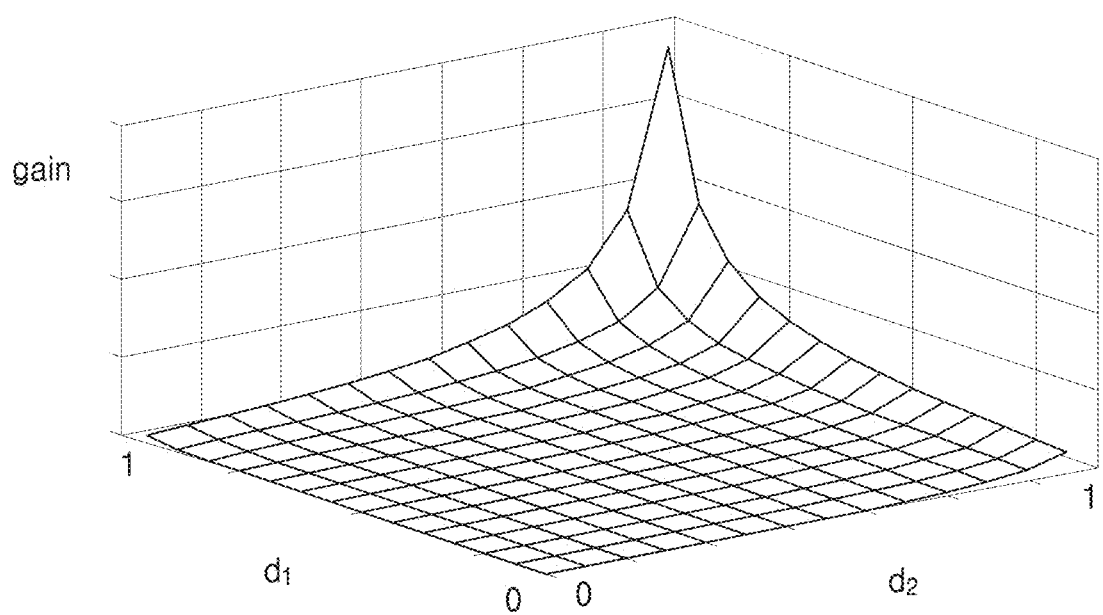
FIG. 9 is a three-dimensional (3D) graph of a voltage gain according to some example embodiments.

FIG. 9 is a three-dimensional (3D) graph of a voltage gain according to some example embodiments. In the 3D graph of FIG. 9, the abscissa (first horizontal axis) denotes a second duty ratio $d_2$ of a second switching signal (e.g., Sig_sw2 of FIG. 4), the ordinate (second horizontal axis) denotes a first duty ratio $d_1$ of a first switching signal (e.g., Sig_sw1 of FIG. 4), and the applicate (vertical axis) denotes a voltage gain 'gain' of a switching regulator.

Referring to FIG. 9 and Equation 5 described above, the voltage gain 'gain' may be proportional to $(1-d_1+d_1d_2)$ and inversely proportional to $(1-d_1)(1-d_2)$ in terms of the first duty ratio $d_1$ and the second duty ratio $d_2$. Accordingly, when each of the first duty ratio $d_1$ and the second duty ratio $d_2$ becomes close to '0,' since each of $(1-d_1+d_1d_2)$ and $(1-d_1)(1-d_2)$ converges to '1,' the voltage gain 'gain' may also converge to '1.' Also, when each of the first duty ratio $d_1$ and the second duty ratio $d_2$ becomes close to '1', since $(1-d_1)(1-d_2)$ converges to '0,' the voltage gain 'gain' may diverge to infinity.

The switching regulator according to some example embodiments may adaptively change the voltage gain 'gain' from '1' to infinity according to variations in a plurality of duty ratios (e.g., variations between the first and second duty ratios $d_1$ and $d_2$).

Figure 10:
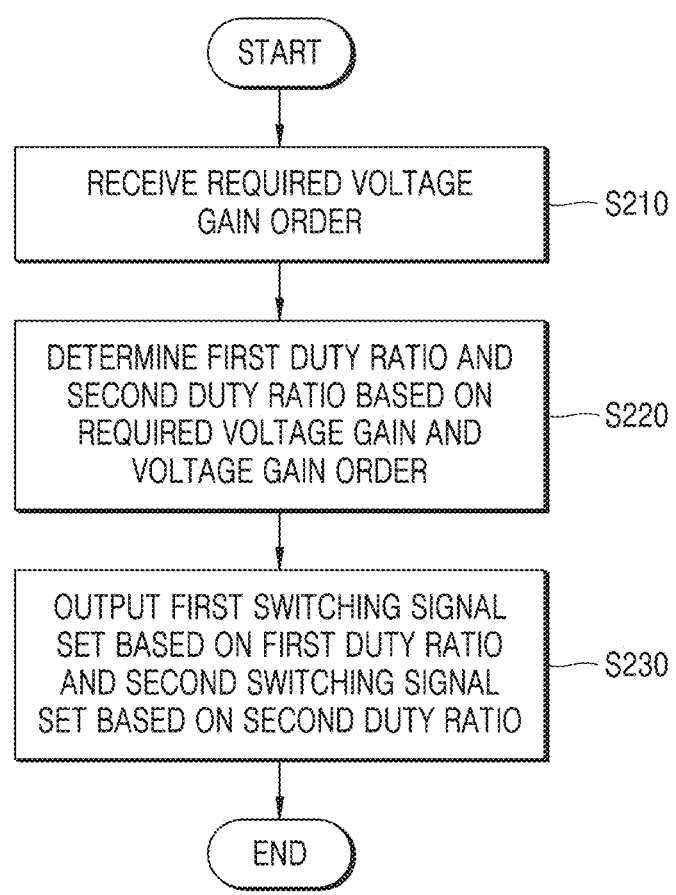
FIG. 10 is a flowchart of an operation of a control circuit according to some example embodiments.

FIG. 10 is a flowchart of an operation of a control circuit 200 according to some example embodiments. Specifically, FIG. 10 illustrates some example embodiments in which the control circuit 200 determines a duty ratio based on a voltage gain order.

Referring to FIGS. 2 and 10, the control circuit 200 may receive a required/given voltage gain and the voltage gain order (S210). As used herein, the voltage gain order may refer to a highest/greatest order, e.g. a highest/greatest mathematical order or degree, of a variable in a formula of a voltage gain. The control circuit 200 may determine a first duty ratio and a second duty ratio based on the voltage gain and the voltage gain order (S220). When the voltage gain order is denoted by N, Equation 8 may be obtained from Equation 7, which is obtained by changing Equation 5 described above.

$$g_m = \frac{V_o}{V_i} = \frac{d_1' + d_1 d_2}{d_1' d_2'} = \frac{1}{d_2'^N} = \frac{1}{A}, \quad \text{[Equation 7]}$$

$$d_1 = \frac{A - d_2'}{d_2'(A-1)} \quad \text{[Equation 8]}$$

In Equations 7 and 8 described above, A denotes $(1-d_2)^N$, and the remaining unknowns/variables are the same as described above in Equations 1 to 5. The control circuit 200 may determine a first duty ratio $d_1$ and a second duty ratio $d_2$ based on a required/given voltage gain $g_m$ and the voltage gain order N using Equations 6 and 7.

The control circuit 200 may generate a first switching signal set Set_sw1 based on the determined first duty ratio $d_1$, output the generated first switching signal set Set_sw1 to the first regulating circuit 110, generate a second switching signal set Set_sw2 based on the determined second duty ratio $d_2$, and output the generated second switching signal set Set_sw2 to the second regulating circuit 120.

The control circuit 200 according to some example embodiments may control the voltage gain order N by adjusting duty ratios of the switching signal sets including the first switching signal set Set_sw1 and the second switching signal set Set_sw2. Accordingly, even if the control circuit 200 does not include additional components, the control circuit 200 may use a plurality of modes according to the voltage gain order N only by controlling a duty ratio.

Figure 11:
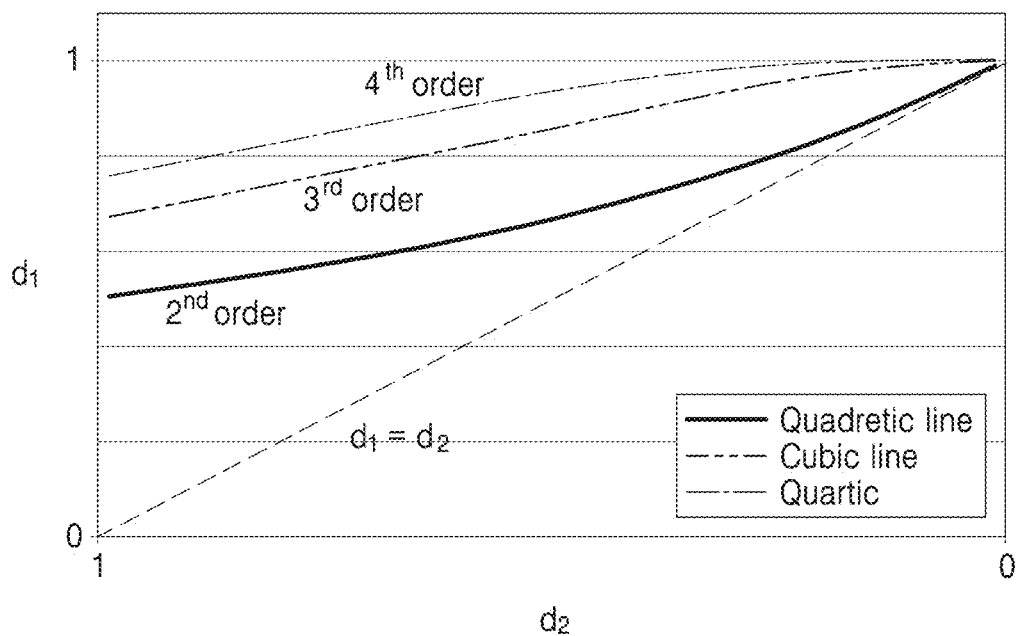
FIG. 11 is a graph showing a duty ratio according to some example embodiments.

FIG. 11 is a graph of a duty ratio according to some example embodiments. Specifically, FIG. 11 is a graph of a duty ratio relative to a required/given voltage gain order. In FIG. 11, the abscissa (horizontal axis) denotes a second duty ratio $d_2$ of a second switching signal (e.g., Sig_sw2 of FIG. 4), and the ordinate (vertical axis) denotes a first duty ratio $d_1$ of a first switching signal (e.g., Sig_sw1 of FIG. 4).

Referring to FIG. 11, the first duty ratio $d_1$ and the second duty ratio $d_2$ relative to the required/given voltage gain order are illustrated. A solid line denotes a case in which a voltage gain order is a second order, a two-point chain line denotes a case in which the voltage gain order is a third order, and an alternating long-short dashed line denotes a case in which the voltage gain order is a fourth order. In some example embodiments, a switching regulator may operate as a boost converter in a region $(d_1>d_2)$ where the first duty ratio $d_1$ is higher/greater than the second duty ratio $d_2$. The switching regulator may operate in a higher voltage gain order as the first duty ratio $d_1$ increases for the same second duty ratio $d_2$.

The switching regulator according to some example embodiments may determine the first duty ratio $d_1$ and the second duty ratio $d_2$ using a tendency shown in FIG. 11, and thus, may perform operations according to different voltage gain orders. In some examples, the switching regulator may maintain the second duty ratio $d_2$ constant and change the first duty ratio $d_1$ to change a voltage gain order.

Figure 12:
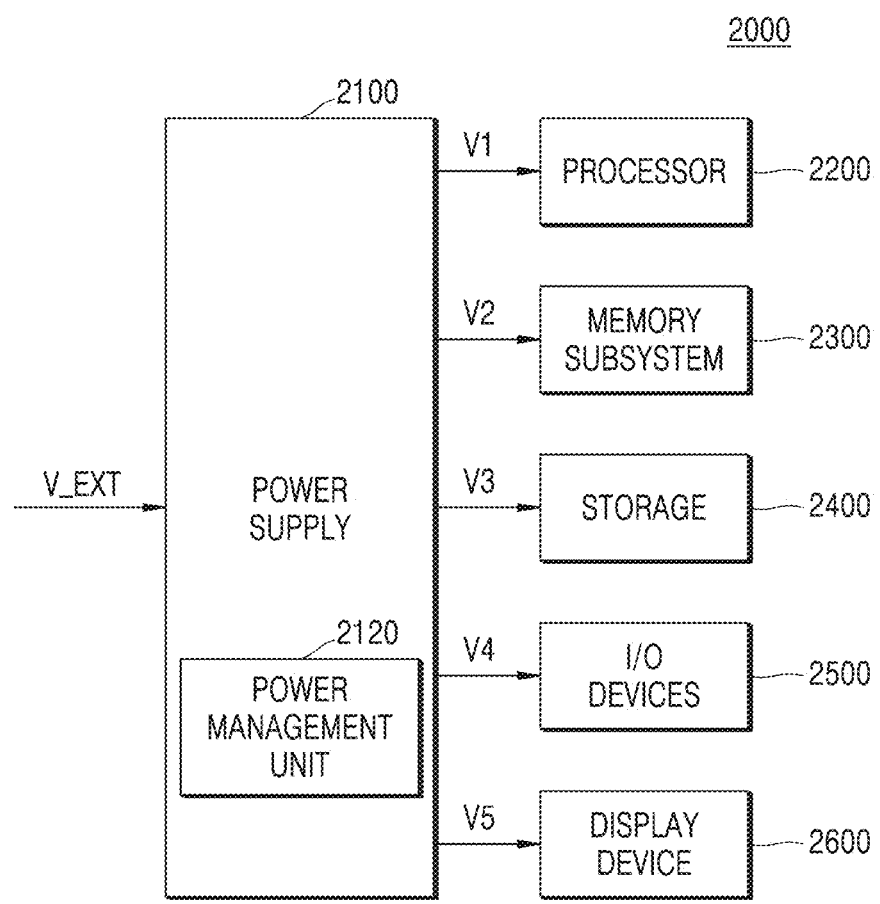
FIG. 12 is a block diagram of a switching regulator according to some example embodiments.

FIG. 12 is a block diagram of a system 2000 including a switching regulator according to some example embodiments.

Referring to FIG. 12, the system 2000 may include a power supply 2100, a processor 2200, a memory sub-system 2300, a storage 2400, input/output (I/O) devices 2500, and a display device 2600.

The processor 2200 may perform specific calculations and/or tasks. For example, the processor 2200 may be or may include a microprocessor (MP), a central processing unit (CPU), or the like. The processor 2200 may communicate with other components of the system 2000 through a bus. The memory sub-system 2300 and the storage 2400 may store data required/used for operations of the system 2000. For example, the memory sub-system 2300 may include a volatile memory device, such as dynamic random access memory (DRAM), static RAM (SRAM), and mobile DRAM. Alternatively or additionally, the memory sub-system 2300 may include a non-volatile memory device, such as flash memory, electrically erasable programmable read-only memory (EEPROM), phase-change RAM (PRAM), resistive RAM (RRAM), magnetic RAM (MRAM), and ferroelectric RAM (FRAM).

The storage 2400 may also include a non-volatile memory device or include a storage medium, such as solid-state drive (SSD), hard disk drive (HDD), and compact disc read-only memory (CD-ROM). The I/O devices 2500 may include an input device, such as a keyboard, a keypad, a touch pad, a touch screen, and a mouse, and an output unit, such as a speaker and a printer. The display device 2600 may include at least one of a liquid crystal display (LCD) device, and an organic light emitting display (OLED) device.

The power supply 2100 may generate first to fifth power supply voltages V1 to V5 based on an external voltage V_EXT and supply the first to fifth power supply voltages V1 to V5 to other components of the system 2000, that is, the processor 2200, the memory sub-system 2300, the storage 2400, the I/O devices 2500 and the display device 2600. For example, the system 2000 may include a battery, and a voltage supplied to the power supply 2100 may be a battery voltage provided by the battery. Alternatively or additionally, the system 2000 may receive power through a power line from the outside, and an external voltage V_EXT may be a voltage generated from the power supplied through the power line. That is, the external voltage V_EXT may be a voltage of the power line or a direct-current (DC) voltage generated by rectifying an alternating-current (AC) voltage supplied from the power line.

The power supply 2100 may include a power management unit 2120 including the switching regulator described above with reference to FIGS. 1 to 11. For example, the power management unit 2120 included in the power supply 2100 may control duty ratios of a plurality of switching signals and generate the first to fifth power supply voltages V1 to V5 from the external voltage V_EXT. The power management unit 2120 according to some example embodiments may control only a duty ratio other than a static configuration and generate a plurality of voltages. Thus, the power management unit 2120 may flexibly configure a voltage gain without changing the static configuration.

Figure 13:
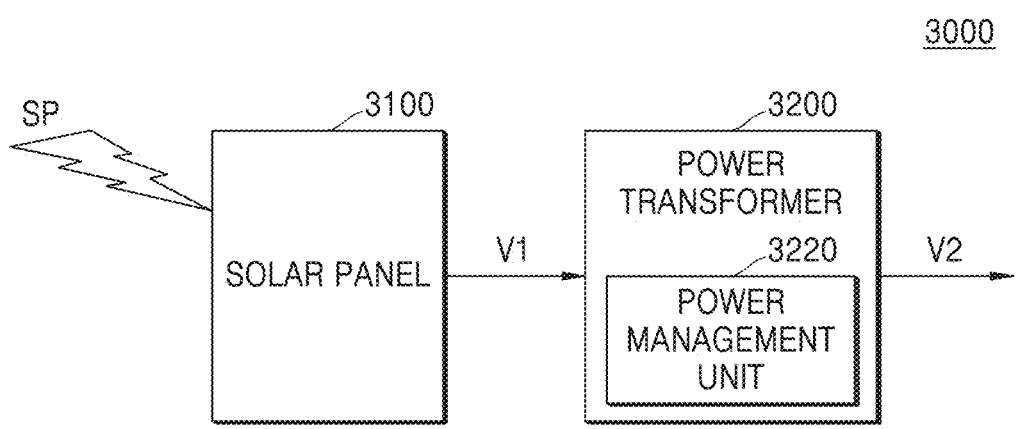
FIG. 13 is a block diagram of a solar generation system according to some example embodiments.

FIG. 13 is a block diagram of a solar generation system 3000 according to some example embodiments.

Referring to FIG. 13, the solar generation system 3000 may include a solar panel 3100 and a power transformer 3200. The solar panel 3100 may include a plurality of solar cells configured to convert solar energy SP into electric energy. The solar cells may include at least one of silicon solar cells, compound semiconductor solar cells, tandem solar cells, dye-sensitized or CdTe- and CIGS-type solar cells, or thin-film solar cells. The solar panel 3100 may generate electric energy having a first voltage V1 using the solar energy SP.

The power transformer 3200 may generate a second voltage V2 based on the first voltage V1 and output the generated second voltage V2 through a power line to the outside (e.g., a substation). The first voltage V1, which is a voltage generated based on the solar energy SP, may have a relatively low voltage level. The power transformer 3200 may boost the first voltage V1 and generate the second voltage V2.

To this end, the power transformer 3200 may include a power management unit 3220 including the switching regulator described above with reference to FIGS. 1 to 11. That is, the power management unit 3220 included in the power transformer 3200 may boost the first voltage V1 by controlling duty ratios of a plurality of switching signals, and generate the second voltage V2. The power management unit 3220 according to some example embodiments may control only a duty ratio other than a static configuration and generate a plurality of voltages. Thus, the power management unit 3220 may flexibly configure a voltage gain without changing the static configuration.

Although FIG. 13 illustrates an example in which the power management unit 3220 according to example embodiments is applied to the solar generation system 3000 used for solar generation, inventive concepts are not limited thereto, and the power management unit 3220 according to the embodiments may be also applied to eco-friendly energy generating systems, such as a tidal power generation system, a wind power generation system, and a geothermal power generation system.

Some components described herein, such as the power management unit 1100 and/or the control circuit 200, may include processing circuitry such as hardware including logic circuits and/or a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts has been particularly shown and described with reference to embodiments thereof, it will be understood that various changes in form and details may be made therein without departing from the spirit and scope of the following claims.

What is claimed is:

1. A switching regulator configured to transform an input voltage and to generate an output voltage, the switching regulator comprising:
   a first regulating circuit configured to regulate the input voltage and to generate a first voltage based on a first switching signal set having a first duty ratio; and
   a second regulating circuit configured to regulate the first voltage and to generate the output voltage based on a second switching signal set having a second duty ratio,
   wherein the switching regulator is configured to determine a voltage gain based on the first duty ratio and the second duty ratio, the voltage gain being related to a mathematical degree of an equation relating the first duty ratio and the second duty ratio, the first duty ratio different from the second duty ratio, the voltage gain corresponding to a ratio of the output voltage to the input voltage,
   the first regulating circuit includes a first switch connected between an input node and a first node, the first switch connected in series with a first inductor that is connected to the first node, the first switch connected in parallel with a second inductor that is connected to the input node, and
   in response to the first switch being open, a first current passes through the first inductor from the first node and a second current passes through the second inductor from the input node.

2. The switching regulator of claim 1, wherein,
   the first regulating circuit comprises a buck-boost converter configured to regulate the input voltage based on the first duty ratio and to generate the first voltage, and
   the second regulating circuit comprises a boost converter configured to regulate the first voltage based on the second duty ratio and to generate the output voltage.

3. The switching regulator of claim 1, wherein the input node is configured to receive the input voltage, the first inductor is between the first node and a ground node, and the first regulating circuit comprises:
   a second switch between the first node and a second node; and
   a first capacitor between the second node and the ground node,
   wherein the second node is configured to receive the first voltage.

4. The switching regulator of claim 3, wherein the second regulating circuit comprises:
   a third switch between the second node and a third node;
   a fourth switch between the third node and an output node with the second inductor between the input node and the third node; and
   a second capacitor between the output node and the ground node,
   wherein the output node is configured to output the output voltage.

5. The switching regulator of claim 4, wherein,
   the first switch and the second switch are configured to operate complementarily to each other based on the first switching signal set, and
   the third switch and the fourth switch are configured to operate complementarily to each other based on the second switching signal set.

6. The switching regulator of claim 5, wherein,
   the switching regulator is configured to turn on the first switch based on the first duty ratio, and the switching regulator is configured to turn on the third switch based on the second duty ratio, wherein the first duty ratio is greater than the second duty ratio.

7. The switching regulator of claim 4, wherein,
the first switching signal set comprises a first switching signal,
the first switch comprises a first transistor having a source terminal connected to the input node, a drain terminal connected to the first node, and a gate terminal configured to receive the first switching signal, and
the second switch comprises a first diode having an input terminal connected to the second node and an output terminal connected to the first node.

8. The switching regulator of claim 4, wherein,
the second switching signal set comprises a second switching signal,
the third switch comprises a second transistor having a source terminal connected to the third node, a drain terminal connected to the second node, and a gate terminal configured to receive the second switching signal, and
the fourth switch comprises a second diode having an input terminal connected to the third node and an output terminal connected to the output node.

9. The switching regulator of claim 4, wherein,
the first switching signal set comprises the first switching signal and a third switching signal having a logic level that is complementary to the first switching signal,
the first switch comprises a first transistor having a source terminal connected to the input node, a drain terminal connected to the first node, and a gate terminal configured to receive the first switching signal, and
the second switch comprises a third transistor having a source terminal connected to the second node, a drain terminal connected to the first node, and a gate terminal configured to receive the third switching signal.

10. The switching regulator of claim 4, wherein,
the second switching signal set comprises the second switching signal and a fourth switching signal having a logic level that is complementary to the second switching signal,
the third switch comprises a second transistor having a source terminal connected to the third node, a drain terminal connected to the second node, and a gate terminal configured to receive the second switching signal, and
the fourth switch comprises a fourth transistor having a source terminal connected to the third node, a drain terminal connected to the output node, and a gate terminal configured to receive the fourth switching signal.

11. The switching regulator of claim 1, wherein the voltage gain is proportional to $(1-d_1+d_2)$ and inversely proportional to $(1-31\ d_1)(1-d_2)$, wherein $d_1$ corresponds to the first duty ratio, and $d_2$ corresponds to the second duty ratio.

12. The switching regulator of claim 1, wherein the switching regulator is configured to determine an order of the voltage gain for the second regulating circuit based on the first duty ratio and the second duty ratio.

13. A power management unit comprising:
a control circuit configured to determine a first duty ratio and a second duty ratio based on a voltage gain, to output a first switching signal set based on the first duty ratio, and to output a second switching signal set based on the second duty ratio; and
a switching regulator configured to boost an input voltage to an output voltage based on the first switching signal set and the second switching signal set,
wherein the voltage gain corresponds to a ratio of the output voltage to the input voltage, the voltage gain being related to a mathematical degree of an equation relating the first duty ratio and the second duty ratio, the first duty ratio different from the second duty ratio;
the switching regulator includes a first switch connected between an input node and a first node, the first switch connected in series with a first inductor that is connected to the first node, the first switch connected in parallel with a second inductor that is connected to the input node, and
in response to the first switch being open, a first current passes through the first inductor from the first node and a second current passes through the second inductor from the input node.

14. The power management unit of claim 13, wherein the switching regulator comprises:
a buck-boost converter configured to regulate the input voltage based on the first duty ratio and to generate a first voltage; and
a boost converter configured to regulate the first voltage based on the second duty ratio and to generate the output voltage.

15. The power management unit of claim 13, wherein the control circuit is configured to determine the first duty ratio and the second duty ratio such that the voltage gain is proportional to $(1-d_1+d_1d_2)$ and inversely proportional to $(1-d_1)(1-d_2)$, wherein $d_1$ corresponds to the first duty ratio and $d_2$ corresponds to the second duty ratio.

16. The power management unit of claim 13, wherein
the given voltage gain is associated with information about an order of a voltage gain,
wherein the control circuit is configured to control at least one of the first duty ratio or the second duty ratio and to determine the order of the voltage gain for the switching regulator.

17. The power management unit of claim 16, wherein, in response to $d_1$ being the first duty ratio, $d_2$ being the second duty ratio, and N being the order of the voltage gain, the control circuit is configured to determine the first duty ratio to satisfy an equation:

$$d_1 = \frac{(1-d_2)^N - (1-d_2)}{(1-d_2)((1-d_2)^N - 1)}$$

18. A switching regulator configured to regulate an input voltage and generate an output voltage, the switching regulator comprising:
a first switch between an input node and a first node, the input node configured to receive the input voltage, the first switch configured to receive a first switching signal having a first duty ratio;
a second switch between the first node and a second node;
a first inductor between the first node and a ground node and in series with the first switch;
a first capacitor between the second node and the ground node;
a third switch between the second node and a third node and configured to receive a second switching signal having a second duty ratio;

a fourth switch between the third node and an output node, the output node configured to output the output voltage;

a second inductor between the input node and the third node and parallel with the first switch; and a second capacitor between the output node and the ground node, wherein in response to the first switch being open, a first current passes through the first inductor from the first node and a second current passes through the second inductor from the input node, and the switching regulator is configured to determine a voltage gain between the output voltage and the input voltage based on the first duty ratio and the second duty ratio by determining a mathematical degree of a ratio of a first polynomial of the first duty ratio to a second polynomial of the first duty ratio.

19. The switching regulator of claim 18, wherein, the first switch and the second switch are configured to operate complementarily to each other based on a first switching signal set, and the third switch and the fourth switch are configured to operate complementarily to each other based on a second switching signal set.

20. The switching regulator of claim 19, wherein, the switching regulator is configured to turn on the first switch based on a first duty ratio, and the switching regulator is configured to turn on the third switch based on a second duty ratio, wherein the first duty ratio is greater than the second duty ratio.

* * * * *